(12) United States Patent
Schmirgel et al.

(10) Patent No.: US 11,926,059 B2
(45) Date of Patent: Mar. 12, 2024

(54) METHOD AND SYSTEM FOR AUTOMATICALLY SECURING THE OPERATION OF A ROBOT SYSTEM CONTROLLED BY A MOBILE OPERATING DEVICE

(71) Applicant: KUKA Deutschland GmbH, Augsburg (DE)

(72) Inventors: Volker Schmirgel, Augsburg (DE); Florian Laquai, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 231 days.

(21) Appl. No.: 17/616,806

(22) PCT Filed: May 27, 2020

(86) PCT No.: PCT/EP2020/064701
§ 371 (c)(1),
(2) Date: Dec. 6, 2021

(87) PCT Pub. No.: WO2020/244997
PCT Pub. Date: Dec. 10, 2020

(65) Prior Publication Data
US 2022/0305659 A1    Sep. 29, 2022

(30) Foreign Application Priority Data
Jun. 7, 2019 (DE) .................... 10 2019 208 314.5

(51) Int. Cl.
*B25J 9/16* (2006.01)
*B25J 13/08* (2006.01)
*G05B 19/409* (2006.01)

(52) U.S. Cl.
CPC ............. *B25J 9/1674* (2013.01); *B25J 13/08* (2013.01); *G05B 19/409* (2013.01)

(58) Field of Classification Search
CPC ........ B25J 9/1674; B25J 13/08; B25J 9/1602; B25J 13/06; G05B 19/409; G05B 2219/35413
See application file for complete search history.

(56) References Cited

U.S. PATENT DOCUMENTS

2004/0148058 A1   7/2004   Johannessen
2005/0015180 A1   1/2005   Steger
(Continued)

FOREIGN PATENT DOCUMENTS

DE        102 55 056 A1    6/2004
DE    10 2008 041 074 B4    7/2010
(Continued)

OTHER PUBLICATIONS

European Patent Office; Search Report in related International Patent Application No. PCT/EP2020/064701 dated Sep. 21, 2020; 2 pages.

(Continued)

*Primary Examiner* — Adam R Mott
*Assistant Examiner* — Matthew C Gammon
(74) *Attorney, Agent, or Firm* — Dorton & Willis, LLP

(57) ABSTRACT

A method and a system for automatically securing the operation of a robot system and corresponding components of the system, wherein operation is controlled by a mobile operating device. The robot system receives presence signals transmitted from a mobile operating device via a short-range first signal connection and an operating signal transmitted via a second signal connection designed to be independent of the first signal connection. The operating signal contains a safety-relevant control command for the robot system. The control command is released for execution by the robot system only if a presence check has ascertained that the last received presence signal satisfies a (Continued)

presence criterion specified with respect to the determination of a spatial proximity of the operating device to the robot system. A configuration signal derived from the result of the presence check is transmitted back to the operating device for configuration based on the result.

12 Claims, 3 Drawing Sheets

(56) References Cited

U.S. PATENT DOCUMENTS

| | | | |
|---|---|---|---|
| 2007/0297890 A1* | 12/2007 | Sjoberg | G06Q 10/0639 |
| | | | 414/815 |
| 2008/0125908 A1 | 5/2008 | Sjoberg | |
| 2009/0079579 A1 | 3/2009 | Griessnig | |
| 2014/0303786 A1 | 10/2014 | Langejurgen | |
| 2017/0308050 A1* | 10/2017 | Matergia | G05B 19/056 |

FOREIGN PATENT DOCUMENTS

| | | |
|---|---|---|
| DE | 10 2011 055 362 A1 | 5/2013 |
| DE | 102016211243 A1 | 12/2017 |
| DE | 10 2017 216 134 A1 | 3/2019 |
| EP | 1 716 982 B1 | 5/2008 |
| EP | 2 020 624 B1 | 12/2010 |

OTHER PUBLICATIONS

German Patent Office; Search Report in related German Patent Application No. 10 2019 208 314.5 dated Mar. 12, 2020; 6 pages.

* cited by examiner

METHOD AND SYSTEM FOR AUTOMATICALLY SECURING THE OPERATION OF A ROBOT SYSTEM CONTROLLED BY A MOBILE OPERATING DEVICE

CROSS-REFERENCE TO RELATED APPLICATIONS

This application is a national phase application under 35 U.S.C. § 371 of International Patent Application No. PCT/EP2020/064701, filed May 27, 2020 (pending), which claims the benefit of priority to German Patent Application No. DE 10 2019 208 314.5, filed Jul. 7, 2019, the disclosures of which are incorporated by reference herein in their entirety.

The present invention relates to the field of operating a robot system by means of a mobile operating device external to the robot system. In particular, the invention relates to a method and a system for automatically securing the operation of a robot system and corresponding components of the system, said operation being controlled by such a mobile operating device.

BACKGROUND

A robot system within the context of the invention is a system that has at least one robot. In addition, the system can optionally also have peripheral components for the robot(s), such as protective devices, workpiece or tool holders or trays, or exchangeable tools for the robot(s). In addition, a robot system has at least one control device for controlling the robot(s), in particular the drives thereof.

Modern robot systems, for example for use in automobile production, are often able to execute very fast and complex movements. In addition, in many applications a plurality of robot systems operating independently of one another or in a network are used in direct spatial proximity to one another, or such a robot system itself has a plurality of individual robots, each of which is subject to a common system control. In the event of malfunctions or failures of a robot system, dangerous situations for people or objects can quickly arise in the effective region of the robot system, which must be recognized and stopped immediately. It is therefore expedient that, for safety reasons, movements or other safety-relevant actions of a robot system can be triggered only in the case when an operator is located in sufficient proximity to the robot system to supervise it, in particular to trigger an emergency stop of the robot system.

In known systems, this is usually ensured in that an emergency stop switch is located on a special operating device belonging to the robot system and permanently associated thereto in the vicinity of the robot, in particular on a corresponding robot cell. Such operating devices are usually wired, so that movements of the robot system can be triggered by the operator only in the case if the operating device is in a cable-connected signal connection to the robot system, in particular to an associated control device, and is therefore located in the proximity of the robot system due to the regularly short length of such cable connections. This ensures that the operator can monitor the operation of the robot system, in particular visually, on the basis of his presence on site, which is necessary for the operation thereof.

SUMMARY

The present invention is based on the object of further improving the operation of a robot system while maintaining the required safety, in particular making it more flexible.

A first aspect of the invention relates to a method for automatically securing an operation of a robot system, said operation being controlled by means of a mobile operating device. The method comprises: (i) repeatedly receiving presence signals on the robot system, in particular on a control device of the same and via a short-range first signal connection, said signals being transmitted to the robot system by a mobile operating device configured for the operation thereof; (ii) transmitting a configuration signal derived from the result of the presence check to the operating device for requesting a configuration of a user interface of the operating device, said interface being provided for operating the robot system on the basis of the result; (iii) receiving an operating signal transmitted to the robot system by the operating device on the robot system and via a second signal connection designed to be independent of the first signal connection, said operating signal containing a control command classified as safety-relevant according to a specified safety criterion, in particular a movement command, for the robot system; (iv) releasing the safety-relevant control command for the execution thereof by the robot system only in the case if a presence check has ascertained that the last received presence signal satisfies a presence criterion which is specified with respect to the determination of a spatial proximity of the operating device to the robot system.

The method can in particular be executed entirely on the robot system to be controlled, in particular a control device of the same. As an alternative thereto, however, step (iv) can also be executed outside the robot system itself, for example by means of an external data processing unit that is in communication with the robot system.

A "short-range" signal connection within the context of the invention is to be understood as a signal connection, the effective range of which for successful signal transmission to a receiver is typically, in particular according to an underlying technical specification of a corresponding signal transmission technology, in the range of up to 50 m, preferably only in the range of up to 10 m. The short-range signal connections include, in particular, signal connections on the basis of what is known as a "Wireless Personal Area Network (WPAN) technology." Some of these WPAN technologies are defined at IEEE as part of the IEEE 802.15 standard family. This includes in particular the Bluetooth and Zigbee technologies. The 6LoWPAN specified by the IETF is also a "short-range" signal connection within the context of the invention.

A "mobile" operating device within the context of the invention is to be understood as a device which is set up to provide a user with a man-machine interface for at least partial operation and/or configuration of a robot system, the operating device not being fixed to a specific location, but rather being mobile, in particular portable and preferably designed as a hand-held device. In particular, instead of an application-specific operating console, the mobile operating device can also be a multipurpose computer, for example a tablet computer, configured by means of corresponding programming for executing the method. It is therefore fundamentally possible for such an operating device to have programming at the same time that allows other applications to be executed that do not serve to operate the robot system.

An "operating signal" within the context of the invention is a signal, in particular a digital signal, which is provided to control the robot system, in particular by means of at least one corresponding control command contained in the signal, or to receive data from the robot system, such as status data, program data, or data detected by sensors by the robot system, such as detected image data.

A "safety-relevant" control command within the context of the invention is to be understood as a control command for controlling the robot system which, when executed on the robot system, causes the robot system to execute one or more safety-relevant actions, in particular actions that are potentially dangerous for objects or people in the vicinity of a robot of the robot system. In particular, movement commands, i.e. control commands which, when executed on the robot system, cause the robot system to execute one or more movements by a robot of the robot system, are each safety-relevant control commands within the context of the invention.

A "presence check" within the context of the invention is to be understood as a check in which it is checked whether the operating device is located in the proximity of the robot system, in particular within a close vicinity of the robot system defined by a maximum distance. The presence check takes place on the basis of the last received presence signal and the received operating signal or a combination of both signals, by means of a specified presence criterion, with the aid of which it is ascertained whether the operating device is located in sufficient proximity to the robot system or not.

The inventive method can thus be used for securing an operation of a robot system, said operation being controlled by means of the mobile operating device, in which, on the one hand, safety-relevant control commands for their execution by the robot system occur only in the case if it was recognized based on the result of the presence check, which in turn is at least depends on a received presence signal, that the operating device is located in sufficient proximity to the robot system, in particular to a control device of the robot system. In the context of the invention, "only in the case" means that at least the mentioned condition must be satisfied (necessary condition), while this does not necessarily have to be sufficient for the release of the execution of the control command, since it is fundamentally possible that in addition other conditions must be satisfied. The control device is preferably equipped with an emergency stop trigger (man-machine interface, e.g. emergency stop switch) for triggering by an operator.

On the other hand, feedback from the robot system to the operating device is provided in that a configuration signal derived from the result of the presence check is transmitted back to the operating device in order to effect a configuration of a user interface of the operating device there, which operating device is used to operate the robot system on the basis of the result of the check. It can thus be ensured in particular that only those functionalities, in particular actions, of the robot system can be triggered on the operating device that can be executed with sufficient safety in view of the current distance of the operating device from the robot system checked by the presence check.

This allows the robot system to be operated by means of the mobile operating device, whereby, on the one hand, greater freedom of movement for the operator and thus a corresponding flexibility in operating the robot system are made possible, while at the same time, on the other hand, the necessary security can be maintained due to the presence check with the dependent release decision thereof for safety-relevant control commands and the result-dependent configuration requirement with regard to the user interface of the operating device. In addition, the invention allows for a more flexible choice of the operating device.

In the following, preferred embodiments of the method are described which, unless this is expressly excluded or technically impossible, can be combined with one another as desired and with the other described aspects of the invention.

In some embodiments, the configuration signal is designed to request a configuration of the user interface, in which the operating options available for a user are defined on the user interface for the robot system on the basis of the result. In particular, this can be done in such a way that if, according to the result of the presence check, the presence criterion has not been satisfied, the configuration signal is configured to request a configuration of the user interface, according to which the operating options available for a user on the user interface for the robot system are restricted in such a way that no transmission of safety-relevant control commands to the robot system can be triggered by the user interface.

If, according to the presence check, it is ascertained that the operating device is located too far away from the robot system according to a scale defined by the presence criterion, a configuration of the user interface is requested using the configuration signal, said user interface being formed, for example, by means of a touch-sensitive screen, for which interface the selection options for an operator to trigger safety-relevant control commands either are no longer displayed or are at least blocked in order to prevent a safety-critical triggering of such control commands from the outset. Thus, double safety is provided in this case, namely, on the one hand, through the corresponding configuration of the user interface based on the configuration signal and, on the other hand, due to the release or non-release of the actual execution of received control commands by the robot system depending on the result of the presence check.

In some embodiments, each operating signal received via the second signal connection and containing a control command is subjected to a safety check prior to any release of this control command for the execution thereof on the robot system to determine whether this control command is safety-relevant according to a specified safety criterion. Only if this is not the case according to the result of this check, this control command is then released for the execution thereof on the robot system without or independently of a previous performance of the presence check or the result thereof. In this way, it is possible to differentiate between safety-relevant and not safety-relevant control commands. While control commands recognized as not safety-relevant are readily released for execution, in particular without performing the presence check, the safety-related check by means of the presence check and the dependent release of control commands recognized as safety-relevant continue to be maintained. In this way, the average performance and efficiency of the method can be increased further.

In particular, according to an associated embodiment, the distinction can be made in such a way that, according to the safety criterion (i), those control commands which are used to cause the robot system to execute one or more movements are classified as safety-relevant, and/or (ii) such control commands, which are used to cause the robot system to output or change information (e.g. status or operating information or program data) without additionally causing the robot system to move, are classified as not safety-relevant. In this way, control commands to initiate one or more movements of the robot system, which typically result in a risk potential in the presence of a person or an object not taken into account in the programming of the robot system in the effective region thereof, are classified as safety-relevant and, accordingly, only in the scope of the method, are executed accordingly on the basis of the result of the presence check, while the control commands related solely to the output of information are classified as uncritical, and are thus executed in a direct way independently of a presence check or the result thereof.

In some embodiments, the presence criterion is defined on the basis of at least one of the following: (i) a signal strength of the presence signal received on the robot system; (ii) a measure for the possible occurrence of transmission errors in the presence signal received on the robot system; (iii) an elapsed period of time since a last reception of a presence signal; (iv) any change in an identification code of the radio access point, a routing for the radio connection of the operating device via the first signal connection or the second signal connection, or both, which change has taken place since the last reception of a presence signal, according to the corresponding information contained in the received operating signal; (v) a distance value determined by means of a radio-based triangulation.

Since the signal strength of a radio signal typically decreases with increasing distance, according to variant (i), the signal strength can serve as a measure for a distance between the operating device and a corresponding receiver on the robot system, which can be used for a simple distance measurement. The distance-dependent occurrence of transmission errors, in particular bit errors in the context of a digital transmission, which can be recognized, for example, by means of a corresponding channel coding, can also be used as a measure according to variant (ii), for example in the form of a bit error rate or another measure that is dependent on the occurrence of transmission errors, to estimate the distance between the operating device and the receiver on the robot system. According to variant (iii), the presence criterion is defined as on the basis of a period of time that has elapsed since the last reception of a presence signal, whereby, with a correspondingly short selection of the period of time, it can be ensured that a sufficient proximity of the operating device to the pipe system is not inadvertently inferred due to a presence signal that occurred a longer time ago, although the distance has actually increased in the meantime and the necessary safety can possibly no longer be ensured. According to variant (iv), a possibly significant change in location of the operating device can also be inferred indirectly, which is done in this case by recognizing corresponding changes in the signal path with respect to the first and/or second signal connection which would be excluded or would be at least unlikely without such a change in location.

In some embodiments, the method further comprises: (i) detecting a coding contained in the received presence signal, operating signal, or both; (ii) checking, based on the detected coding, whether it matches a reference coding associated to the robot system and whether the received presence signal, operating signal, or both is or are directed to the robot system; and (iii) blocking a possible release of the control command contained in the received operating signal if, according to the detected coding, the received presence signal, operating signal, or both is or are not directed to the robot system. In this way, it can be ensured by means of the coding that the robot system is not incorrectly controlled by means of an operating device that is not intended for this purpose or is not authorized for this purpose, or that the presence check is executed on the basis of an operating device that is not associated to the robot system. Thus, the safety with regard to the control of the robot system can be further increased and also the possibility can be created to operate a plurality of robot systems and operating devices in great spatial proximity to one another (i.e. within the range of the corresponding presence signals) without causing a misallocation of presence signals and operating signals to corresponding robot systems. The coding can in particular be defined on the basis of a serial number of the robot system or the operating device.

In particular, according to some associated embodiments, the method can furthermore have a pairing process in which the robot system: (i) defines the reference coding associated thereto prior to detecting and transmits it to the operating device, in particular in order to enable it to convert the coding into a presence signal or operating signal, or (ii) receives the reference coding associated thereto from the operating device prior to checking, in particular in order to identify presence signals and operating signals on the basis thereof, which signals are directed to the robot system as signals associated to the robot system and to distinguish them from other signals and to provide signals, in particular the configuration signal, to be transmitted from the robot system to the operating device with the coding.

A second aspect of the invention relates to a device, in particular to a control device of a robot system, for securing an operation of a or the robot system, said operation being controlled by means of a mobile operating device, the device being set up to execute the method according to the first aspect of the invention.

A third aspect of the invention relates to a computer program which, when executed on a device according to the second aspect of the invention, is configured to cause the device to execute the method according to any of the preceding claims.

The embodiments and advantages explained in relation to the first aspect of the invention also apply accordingly to the second and third aspects of the invention.

A fourth aspect of the invention relates to a method for operating a robot system by means of a mobile operating device, wherein the method comprises: (i) regularly transmitting a presence signal directed to the robot system via a short-range first signal connection; (ii) after transmitting the presence signal, receiving a configuration signal from the robot system, wherein the configuration signal represents or contains a configuration request for the configuration of a user interface of the operating device, said interface being provided for operating the robot system; (iii) configuring the user interface on the basis of the configuration request in the received configuration signal; and (iv) transmitting an operating signal directed to the robot system via a second signal connection formed independently of the first signal connection in response to an associated input at the user interface configured in accordance with the configuration signal.

This method thus forms the counterpart to the method according to the first aspect of the invention and is intended to interact therewith. The regular transmission (as well as the repeated reception of the presence signal on the robot system side) is used to regularly, in particular continuously, ensure that the relative distance of the operating device to the robot system is checked promptly as part of the presence check, and the result thereof can be used as the basis for triggering and performing remote control commands by means of the operating device as well as for configuring the user interface in order to effect an at least substantially complete securing of the operation of the robot system.

In the following, preferred embodiments of this method are described which, unless this is expressly excluded or technically impossible, can be combined with one another as desired and with the other described aspects of the invention.

In some embodiments, the presence signal, the operating signal, or both is or are provided with a reference coding associated to the robot system, which reference coding identifies that the corresponding signal is directed to the robot system. The coding can in turn, as already mentioned above, be or become defined in particular on the basis of a serial number of the operating device or the robot system.

In some embodiments, the method furthermore has a pairing process in which the operating device: (i) receives a reference coding associated thereto from the robot system, or (ii) generates and transmits the reference coding associated to the robot system before transmitting the presence signal. This pairing process thus corresponds in mirror image to that already described in connection with the first aspect of the invention and can in particular coincide with this in the sense of one of two sides of the same process.

In some embodiments, the configuration of the user interface effects a configuration of the user interface, according to which the operating options available for a user on the user interface for the robot system are restricted in such a way that no transmission of safety-relevant control commands to the robot system can be triggered by the user interface. In particular, the configuration of the user interface can comprise a configuration of the selection options made available for the user in such a way that selection options for safety-relevant control commands are no longer made available or are blocked. In the case of a graphical user interface, this can take place in particular in that buttons or other control elements for triggering safety-relevant control commands are no longer displayed or at least can no longer be activated, i.e. they are blocked. The latter can in particular be identified with a corresponding change in the display thereof, for example by a representation that has been changed in color or in some other way.

In the following, preferred embodiments are described, each of which applies to both of the aforementioned methods and, unless this is expressly excluded or technically impossible, can be combined with one another as desired and with the other described aspects of the invention.

In some embodiments, the first signal connection is designed as one of the following: (i) a short-range radio connection, in particular based on WPAN radio technology; (ii) a cable-connected connection routed via an audio output of the mobile operating device, in particular configured as a headphone connection.

Wireless Personal Area Network (WPAN) radio technologies are short-range radio technologies that aim to avoid short, typical on-the-fly cable connections. In contrast to WLANs, WPANs bridge shorter distances; distances between 0.2 meters (m) and 50 m are typical. This means that only the immediate vicinity of the sender is reached, the "personal region." In particular, the radio technologies standardized in accordance with IEEE 802.15, which in turn include in particular Bluetooth and Zigbee, are each WPAN technologies. The same applies in particular to the 6LoW-PAN technology specified by IETF.

In some embodiments, the second signal connection has a greater bandwidth than the first signal connection. In this way, it is possible in particular to use a narrowband, short-range radio technology for the presence signal, while the second signal connection can be used as a broader bandwidth data connection, via which in particular not only control commands but also other, above all, more extensive information, such as program information for the robot system or status reports about the status thereof etc., can be transmitted more efficiently than via the first data connection. In addition, the range of the second signal connection can be selected to be greater than that of the first signal connection, so that the data exchange via the second data connection can also take place over greater distances than is possible with the first data connection. In particular, the second data connection can be implemented by means of WLAN technology, in particular radio technology standardized in accordance with IEEE 802.11.

A fifth aspect of the invention relates to a mobile operating device, in particular a hand-held mobile multipurpose computer, which operating device is configured to execute the method according to the fourth aspect of the invention.

A sixth aspect of the invention relates to a computer program which, when executed on a mobile operating device according to the fifth aspect of the invention, is configured to cause the latter to execute the method according to the fourth aspect of the invention.

The embodiments and advantages explained in relation to the fourth aspect of the invention also apply accordingly to the fifth and sixth aspects of the invention.

A seventh aspect of the invention finally relates to a system for securing an operation of a robot system, said operation being controlled by means of a mobile operating device having a device according to the second aspect of the invention and having an operating device according to the fifth aspect of the invention. The robot system itself can also be part of this system as a whole.

The embodiments and advantages explained in relation to the other aspects of the invention thus also apply accordingly to the seventh aspect of the invention.

The corresponding computer program according to the third or sixth aspect of the invention can in particular be stored on a non-volatile data carrier. This is preferably a data carrier in the form of an optical data carrier or a flash memory module. This can be advantageous if the computer program as such is to be handled independently of a processor platform on which the one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules.

The device, the operating device, or the system according to the second, fifth, or seventh aspect of the invention can accordingly have a program memory in which the corresponding associated computer program is stored. Alternatively, the corresponding device or the system as a whole can also be set up to access an externally available computer program, for example on one or more servers or other data processing units, via a communication connection, in particular in order to exchange data with this program that are used during the course of the method or computer program or represent outputs of the computer program.

Further advantages, features and possible applications of the present invention emerge from the following detailed description in connection with the figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
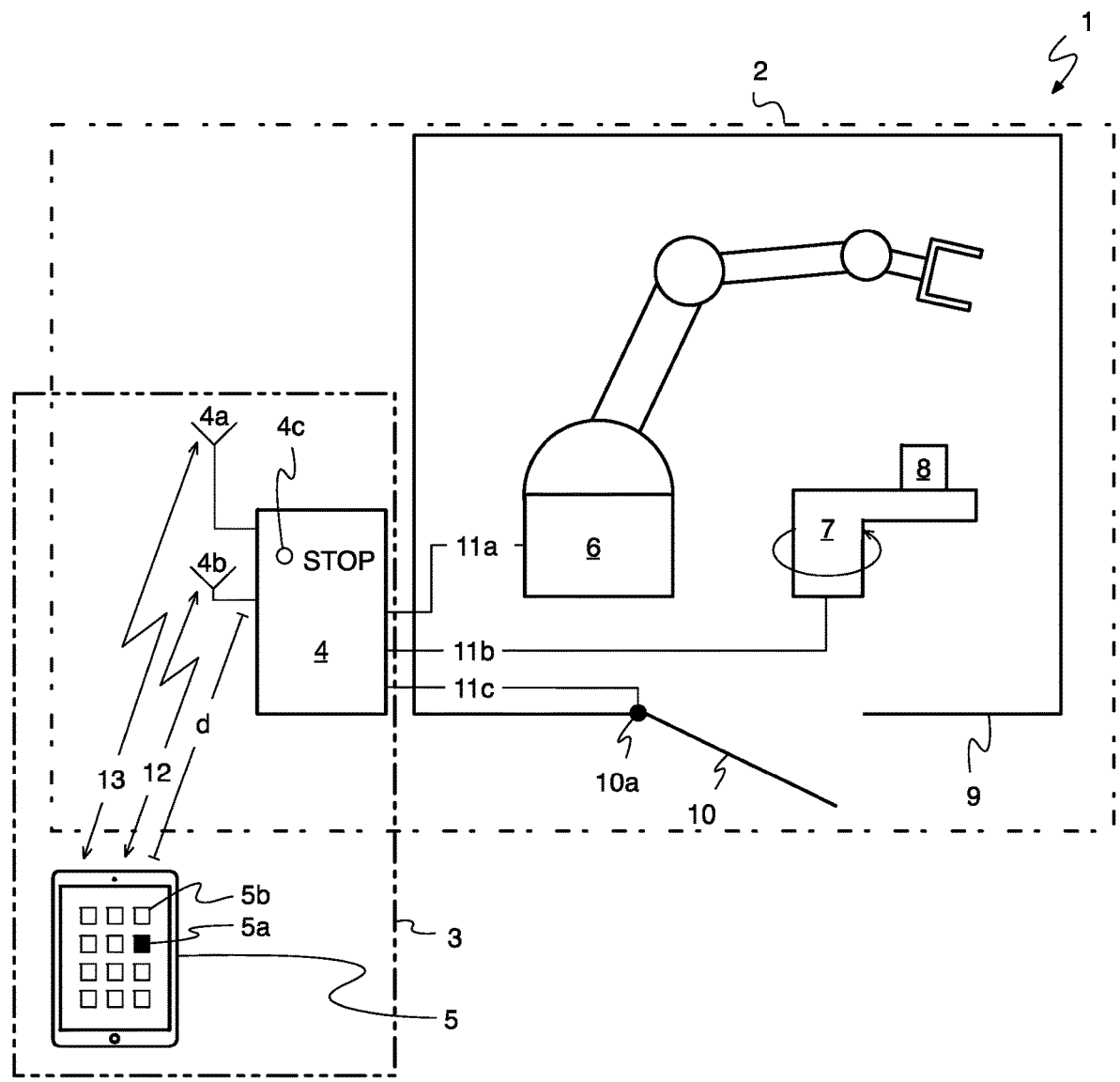
FIG. 1 schematically shows an exemplary system according to an embodiment of the invention.

The system 1 shown in FIG. 1 has a robot system 2 as a first subsystem and a system 3 as a second subsystem for automatically securing operation of the robot system 2, said operation being controlled by means of a mobile operating device 5. In the illustration according to FIG. 1, the robot system 2 has a robot 6 which is mounted, together with a movable, in particular at least partially rotatable peripheral device 7, on a workpiece 8 for processing by the robot 6. Furthermore, the robot system can optionally have a protective fence 9 surrounding the robot 6 and the peripheral device 7, which protective fence at the same time defines a cell of the robot system 2. In the protective fence 9, a door 10 is provided which can be pivoted about a driven axis 10a in order to allow operating or maintenance personnel to access the robot cell. In addition, the robot system 2 has a control device 4 arranged outside the protective fence 9 for controlling the robot 6 and the peripherals thereof, in particular the peripheral device 7 and the door 10 or the door drive 10a thereof. The controller and sensor monitoring of these components 6, 7 and 10/10a by the control device 4 takes place via corresponding control/measuring lines 11a, 11b, and 11c, which are associated to the components as shown in FIG. 1 and connect them to the control device 4.

The control device 4 at the same time forms a component of the system 3, so that the two subsystems 2 and 3 in the form of the control device 4 have at least one common component. A first radio device having a first antenna 4a for sending and receiving radio signals using a short-range and first radio technology, in particular Bluetooth, via a first signal connection 12 between the control device 4 and the operating device 5 is provided on the control device 4. The operating device 5 can in particular—as shown in FIG. 1—be designed as a tablet computer.

Furthermore, the control device 4 has a second radio device having a second antenna 4b for sending and receiving operating signals using a second radio technology different from the first radio technology, in particular broadband and/or more extensive, for example WLAN, via a second signal connection 13 between the control device 4 and the operating device 5 which is currently located therefrom at a spatial distance d from the control device. The control device 4 also has an emergency stop trigger in the form of an emergency stop switch, which is provided to be manually activated by an operator of the system 1 in an emergency in order to effect an immediate emergency shutdown of the robot system. In another embodiment (not shown), the first signal connection can be replaced or supplemented by a cable-connected signal connection which can in particular be routed via an audio interface of the operating device, for example via a headphone connection.

The operating device 5 has a configurable user interface with various virtual keys, to which in particular the virtual keys 5a, 5b belong. The transmission of at least one specific associated operating signal with at least one corresponding control command directed to the robot system 2, in particular the control device 4, can be triggered by means of the virtual keys if the corresponding virtual key can be activated according to the configuration. In the present embodiment, the virtual key 5a represents a key that is currently blocked and therefore cannot be activated, so that no such operating signal can be triggered with it as long as it is still in the blocked state. The further virtual key 5b, on the other hand, can currently be activated, so that by actuating it, the generation and transmission of a corresponding operating signal directed to the control device 4 can be triggered as long as it can be activated in accordance with the configuration.

Figure 2A:
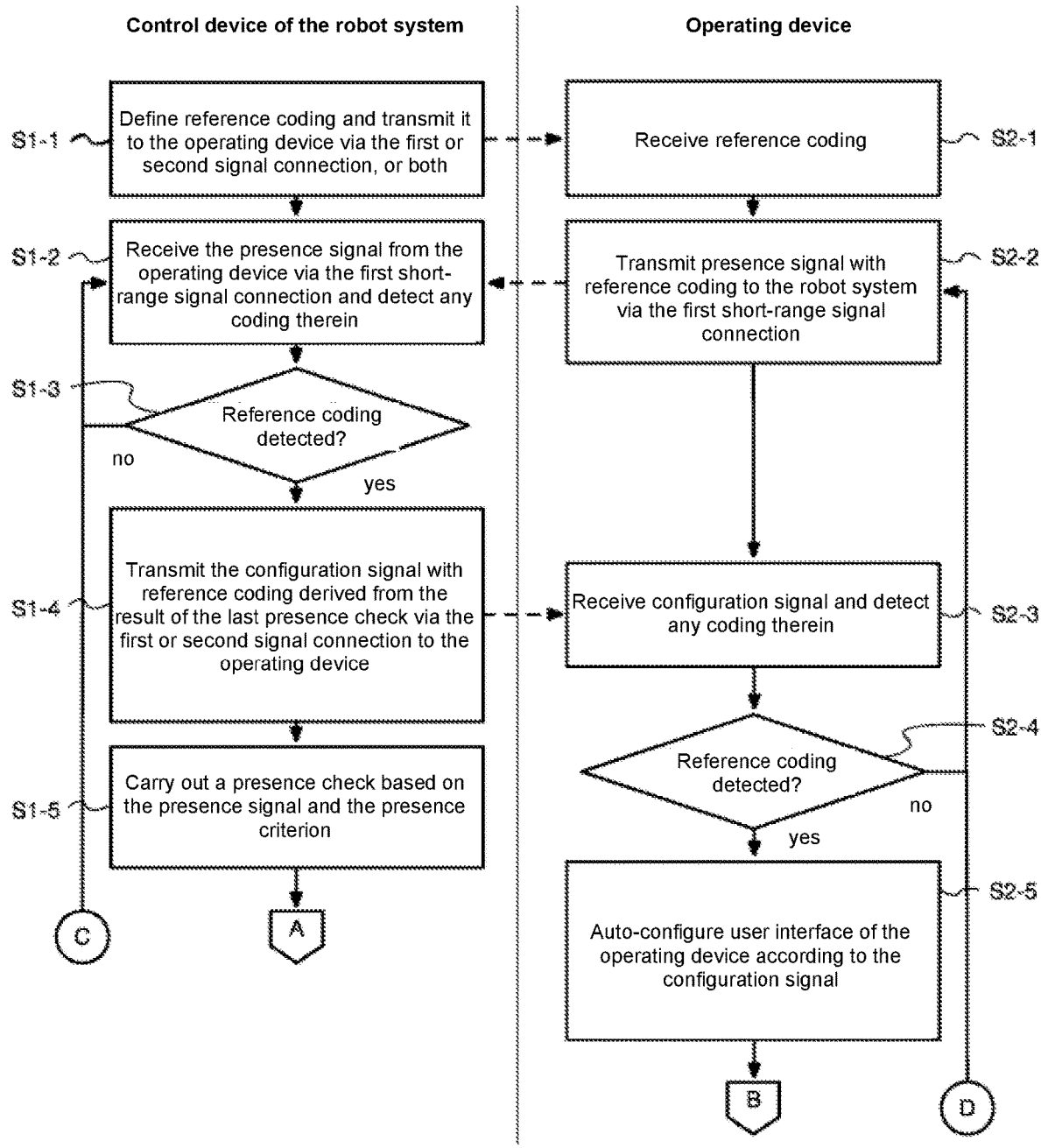
FIG. 2A, B show a flow chart to illustrate preferred embodiments of the two inventive methods and their interaction.
Figure 2B:
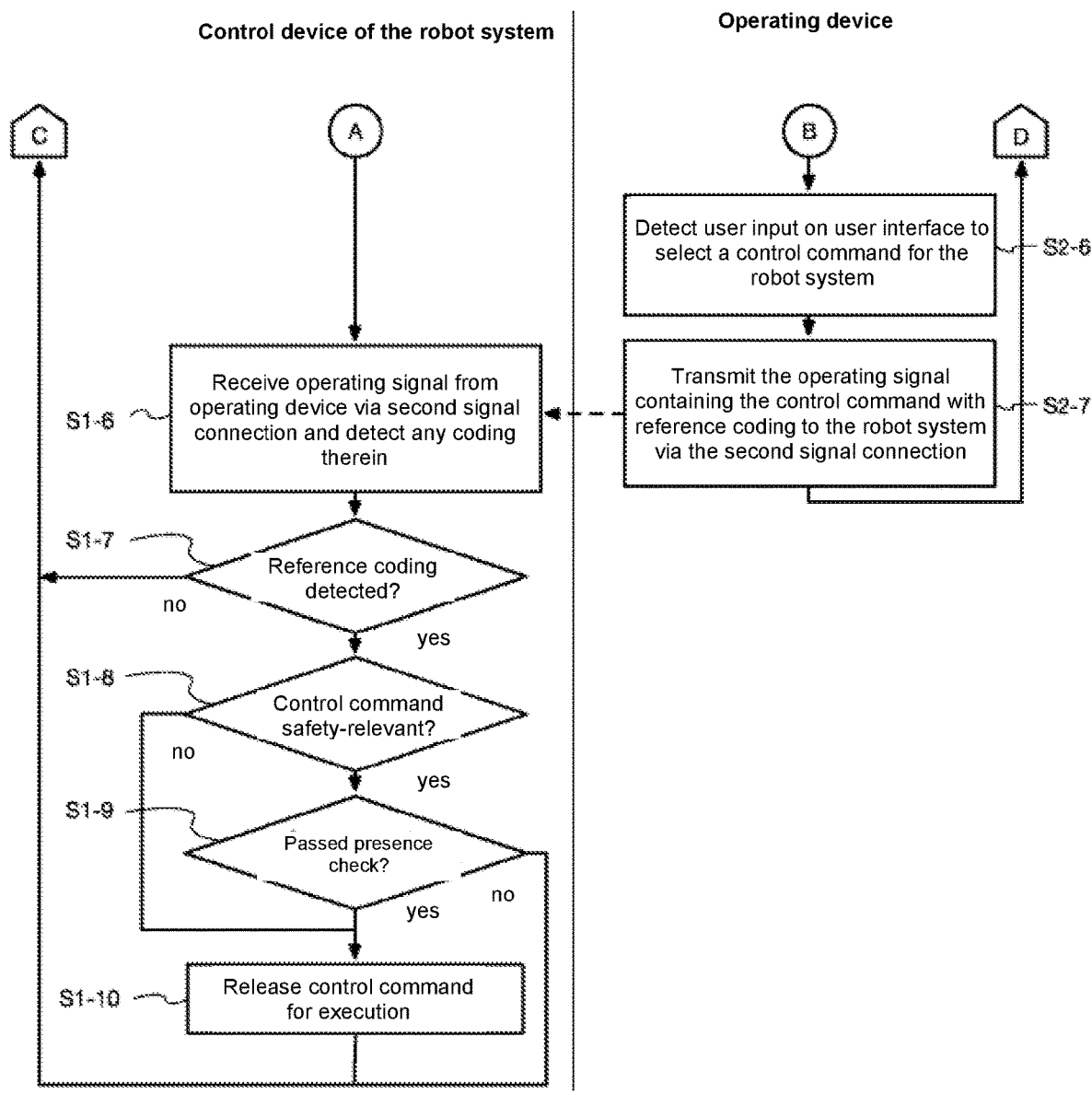

The operation of the system 1, in particular of the subsystem 2, will now be explained with further reference to FIG. 1 with reference to the method illustrated in FIGS. 2A and 2B, wherein FIGS. 2A and 2B are connected to one another via corresponding connectors A to D and overall represent a coherent process flow. The left-hand side of these figures shows an embodiment of a method (steps S1-1 to S1-10) which is executed on the control device 4 of the robot system 2 and can be implemented there in particular by means of a computer program code stored in a memory in the control device 4. The right-hand side of these figures, on the other hand, shows an embodiment of a method (steps S2-1 to S2-7) which is executed on the operating device 5 and can also be implemented there in particular by means of a computer program code stored in a memory of the operating device 5. As shown in FIGS. 2A and 2B and explained in more detail below, the two methods interact in order to allow for automatic securing of the operation of the robot system 2 in their interaction, said operation being controlled by means of the mobile operating device 5.

At the beginning of the process sequence, there is a pairing process which comprises steps S1-1 and S2-1, wherein, in step S1-1, the control device 4 defines a reference coding for itself or the robot system 2 and this reference coding is transmitted to the operating device 5 and received there in step S2-1 via the first signal connection 12 or the second signal connection 13, or via both. The reference coding can in particular be derived from a one-to-one identifier of the robot system, in particular the control device thereof, or correspond to this, wherein the identifier can in particular be a serial number of the robot system. Both sides of the signal connections, i.e. both the control device 4 and the operating device 5, now have the same reference coding associated to the robot system or the control device 4 thereof, by means of which radio signals related to robot system 2 or control device 4 from other radio signals, for example for other robot systems or operating devices, can be distinguished.

In a step S2-2, the operating device 5 transmits a presence signal containing the reference coding to the control device 4 of the robot system 2 via the first signal connection 12. In a corresponding step S1-2, the control device 4 receives a presence signal and detects any coding contained therein and then checks this in a further step S1-3 to determine whether it is the reference coding. If this is not the case (S1-3—no), the method branches back to step S1-2. Otherwise (S1-3—yes), in particular if the presence signal received is an error-free receiving presence signal from the associated operating device 5, the reference coding is recognized as such in step S1-3 and the method is continued on the part of the control device in step S1-4. In this, a configuration signal containing the reference coding, which is derived from the result of the last previously executed presence check, is transmitted via the first or the second signal connection, or both, to the operating device 5. In the corresponding step S2-3, the configuration signal is received on the operating device 5 on the side of the operating device. If the reference coding is successfully detected (S2-4—yes), the operating device 5 executes an auto-configuration of the user interface thereof in step 2-5 according to the configuration signal.

Otherwise (S2-4—no), a jump back to step S2-2 takes place without execution of step 2-5.

A further step 1-5 then takes place on the part of the robot system, in which a presence check is executed based on the presence signal and a specified presence criterion. The presence criterion can be defined in particular as on the basis of a signal strength of the received presence signal, a recognized transmission error (for example bit error rate) which is, in particular, possibly determined and corrected by means of an error correction method according to a channel coding, or a period of time that has elapsed since the last reception of a previous presence signal from the operating device 5. It is also possible to define the presence criterion on the basis of whether there has been a change in the radio access point (e.g. WLAN access point) used for the signal connection with respect to the first and/or second signal connection, which means a greater distance d from the operating device 5 can be inferred by the control device 4 if it is located in the radio area of another radio access point and the first or second signal connection previously ran via this other radio access point. Finally, the presence criterion can also be defined on the basis of the result of a radio-based triangulation for determining the distance.

For the purpose of controlling the robot system 2, a user input for selecting a control command for the robot system 2 can be detected in a step S2-6 on a user interface of the operating device 5. In step S2-7, the control command is then transmitted to the control device 4 of the robot system 2 by means of a corresponding operating signal, which is also provided with the reference coding, via the second signal connection 13 and is received there in a step S1-6. The control device 4 then again detects the coding in the received operating signal and compares it with the reference coding in step S1-7. If the reference coding cannot be recognized in the operating signal (S1-7—no), the control device-side method branches back to step S1-2.

Otherwise (S1-6—yes), a step S1-8 follows, in which a check is made to determine whether the control command from the operating signal is a safety-relevant control command, in particular a movement command for one or more components of the robot system 2. If this is not the case (S1-8—no), a release of the control command takes place immediately in a step S1-10 for execution by the robot system 2 and then a jump back to step 1.2 takes place for a new run. Otherwise (S1-8—yes), in the following step S1-9, the method jumps on the basis of the result of the presence check from step S1-5 also to step S1-10, if the presence check was passed (S1-9—yes) and otherwise (S1-9—no) it jumps back to step S1-2 for a new run while skipping step S1-10. On the operating device side, a jump is made back to step S2-2 after step S2-7.

Thus, by means of the interacting methods, an automatic securing of the operation of the robot system 2 takes place, said operation being controlled by the mobile operating device 5, so that, on the one hand, only corresponding controls of the robot system 2 are allowed to be triggered on the operating device 5 to the previous configuration signal, which in turn is derived from the previous presence check. On the other hand, even if a control command is successfully issued, the release thereof for execution on the robot system 2 can be refused if, according to the last presence check executed, the operating device 5 is not located in the proximity required for safety reasons for the execution of the control command by the robot system relative to the control device 4, in particular relative to the emergency stop switch 4c thereof.

While at least one embodiment has been described above, it should be understood that a large number of variations exist therefor. It should also be noted that the embodiments described represent only non-limiting examples, and it is not intended to limit the scope, applicability, or configuration of the devices and methods described herein. Rather, the preceding description will provide a person skilled in the art with instructions for implementing at least one embodiment, it being understood that various changes in the mode of operation and the arrangement of the elements described in an embodiment can be made without departing from the subject matter specified in each case in the appended claims, as well as the legal equivalents thereof.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE SIGNS

1 Inventive system, including a robot system
2 Robot system
3 System for securing operation of the robot system 2, said operation being controlled by means of a mobile operating device
4 Control device
4a Antenna for first signal connection
4b Antenna for second signal connection
4c Emergency stop triggers, in particular emergency stop switches
5 Operating device
5a Deactivated virtual key on user interface
5b Activatable virtual key on user interface
6 Robot
7 Rotatable peripheral device
8 Workpiece
9 Robot cell with protective fence
10 Door in robot cell or protective fence
10a Hinge and drive of the door 10
11a Control/measurement lines for robots 6
11 b Control/measurement lines for peripheral device 7
11c Control/measurement lines for door drive 10a
12 First, short-range signal connection
13 Second signal connection
d Spatial distance between operating device 5 and control device 4

What is claimed is:

1. A method for automatically securing an operation of a robot system, wherein the operation is controlled by a mobile operating device, the method comprising:
periodically receiving presence signals by the robot system via a short-range first signal connection, the signals being transmitted to the robot system by the mobile operating device configured for operation of the robot system;
transmitting a configuration signal derived from the result of a presence check to the mobile operating device for requesting a configuration of a user interface of the mobile operating device, the user interface being provided for operating the robot system on the basis of the result of the presence check;

receiving an operating signal transmitted to the robot system by the mobile operating device via a second signal connection designed to be independent of the first signal connection, the operating signal containing a control command identified as safety-relevant according to a specified safety criterion for the robot system;

releasing the safety-relevant control command for execution by the robot system only when the presence check has ascertained that the last received presence signal satisfies a presence criterion which is specified with respect to the determination of a spatial proximity of the mobile operating device to the robot system;

subjecting each operating signal received via the second signal connection and containing a control command to a safety check prior to releasing the control command for execution thereof, wherein the safety check determines whether the control command is safety-relevant to a specified safety criterion; and releasing the respective control command for execution by the robot system without, or independently of, a previous performance of the presence check or a result thereof only when the result of the safety check determines that the control command is not safety-relevant to the specified safety criterion.

2. The method of claim 1, wherein the safety-relevant control command is a movement command for the robot system.

3. The method of claim 1, wherein the first signal connection is designed as a short-range radio connection, in particular based on WPAN radio technology.

4. The method of claim 1, further comprising:
according to the safety criterion, identifying as safety-relevant any control commands that are used to cause the robot system to execute one or more movements; and
identifying as not safety-relevant any control commands that are used to cause the robot system to output or change information without additionally causing the robot system to move.

5. The method of claim 1, wherein the presence criterion is defined on the basis of at least one of:
a signal strength of a presence signal received at the robot system;
a measure for the possible occurrence of transmission errors in the presence signal received at the robot system;
an elapsed period of time since a last reception of a presence signal;
any change in an identification code of a radio access point or a routing for a radio connection of the operating device via the first signal connection, via the second signal connection, or via both signal connections, which change has taken place since the last reception of a presence signal, according to the corresponding information contained in the received operating signal; or
a distance value determined by a radio-based triangulation.

6. The method of claim 1, wherein the configuration signal is designed to request a configuration of the user interface such that operating options available for a user are defined on the user interface for the robot system on the basis of the result of the presence check.

7. The method of claim 6, wherein, in response to the presence criterion not being satisfied according to the result of the presence check, the configuration signal is configured to request a configuration of the user interface such that the operating options available for a user on the user interface for the robot system are restricted so that no transmission of safety-relevant control commands to the robot system can be triggered by the user interface.

8. The method of claim 1, further comprising:
detecting a coding contained in a received presence signal, operating signal, or both;
checking whether the detected coding matches a reference coding associated with the robot system, and whether the received presence signal, operating signal, or both is directed to the robot system; and
blocking a release of the control command contained in the received operating signal, according to the detected coding, in response to the received presence signal, operating signal, or both not being directed to the robot system.

9. The method of claim 8, wherein, in a pairing process, the method further comprises:
defining the associated reference coding prior to detecting, and transmitting the reference coding to the operating device; or
receiving at the robot system the associated reference coding from the operating device prior to checking whether the detected coding matches a reference coding associated with the robot system.

10. A device for securing the operation of a robot system, wherein operation of the robot system is controlled by a mobile operating device, the device designed to execute the method according to claim 1.

11. The device of claim 10, wherein the device is configured as a robot controller.

12. The device of claim 10, wherein the first signal connection is designed as a short-range radio connection, in particular based on WPAN radio technology.

* * * * *